(12) United States Patent
Andrews

(10) Patent No.: US 6,278,109 B1
(45) Date of Patent: Aug. 21, 2001

(54) FACET TRACKING USING WAVELENGTH VARIATIONS AND A DISPERSIVE ELEMENT

(75) Inventor: John R. Andrews, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 745 days.

(21) Appl. No.: 08/598,854

(22) Filed: Feb. 9, 1996

(51) Int. Cl.⁷ .................................................. H01J 3/14
(52) U.S. Cl. ............................................ 250/236; 347/261
(58) Field of Search ................................ 250/236, 235, 250/234; 347/259, 260, 261, 250

(56) References Cited

U.S. PATENT DOCUMENTS

| | | | |
|---|---|---|---|
| 3,910,657 | 10/1975 | Dosne | 308/216 |
| 3,995,110 | 11/1976 | Starkweather | 178/7.6 |
| 4,230,394 | 10/1980 | Brueggemann et al. | 350/6.8 |
| 4,559,562 | * 12/1985 | Kramer | 358/208 |
| 4,845,358 | * 7/1989 | Asada | 250/235 |
| 5,204,523 | 4/1993 | Appel et al. | 250/236 |
| 5,204,694 | 4/1993 | Andrews | 346/108 |
| 5,208,456 | 5/1993 | Appel et al. | 250/236 |
| 5,262,887 | * 11/1993 | Feinberg | 359/211 |
| 5,363,126 | * 11/1994 | Andrews | 346/108 |
| 5,455,618 | * 10/1995 | Hatori | 347/261 |
| 5,498,869 | * 3/1996 | Appel et al. | 250/236 |

* cited by examiner

Primary Examiner—John R. Lee
Assistant Examiner—Kevin Pyo
(74) Attorney, Agent, or Firm—John M. Kelly; David E. Henn

(57) ABSTRACT

An improved raster scanner, and electrostatographic printing machines which use such scanners, in which facet tracking is achieved by incorporating a semiconductor laser having an electronically tunable wavelength and a wavelength dispersive element which directs the laser beam onto the facets of a rotating polygon. The wavelength dispersive element is positioned, and the wavelength output from the laser is adjusted, such that as the polygon rotates the laser beam produces a spot on a facet which tracks the facet.

11 Claims, 3 Drawing Sheets

FACET TRACKING USING WAVELENGTH VARIATIONS AND A DISPERSIVE ELEMENT

FIELD OF THE INVENTION

The present invention relates to electrostatographic systems which include raster output scanners. More specifically, this invention relates to such systems which use facet tracking.

BACKGROUND OF THE INVENTION

Electrostatographic marking is a well known and commonly used method of copying or printing documents. Electrostatographic marking is typically performed by exposing a light image of an original document onto a substantially uniformly charged photoreceptor. In response to that light image the photoreceptor discharges so as to create an electrostatic latent image of the original document on the photoreceptor's surface. Toner particles are then deposited onto the latent image so as to form a toner image. That toner image is then transferred from the photoreceptor, either directly or after an intermediate transfer step, onto a marking substrate such as a sheet of paper. The transferred toner image is then fused to the marking substrate using heat and/or pressure. The surface of the photoreceptor is then cleaned of residual developing material and recharged in preparation for the creation of another image.

The foregoing generally describes a typical black and white electrostatographic marking machine. Electrostatographic marking can also produce color images by repeating the above process once for each color that makes the color image. For example, the charged photoreceptor may be exposed to a light image which represents a first color, say cyan. The resultant electrostatic latent image can then be developed with cyan toner particles to produce a cyan image which is subsequently transferred to a marking substrate. The foregoing process can then be repeated for a second color, say magenta, then a third color, say yellow, and finally a fourth color, say black. Beneficially each color toner image is transferred to the marking substrate in superimposed registration so as to produce the desired composite toner powder image on the marking substrate.

Electrostatographic marking machines have increasingly utilized digital technology to produce permanent outputs from video data representations of an original image. In that case, it is beneficial to use a raster output scanner (ROS) for exposing the charged photoreceptive surface so as to record an electrostatic latent image. Generally, a raster output scanner includes a laser that generates a laser beam which is modulated in conformance with the video data representation. That modulated laser beam is then directed onto the photoreceptive surface by an optics system which usually includes a lens system for forming the laser beam into a spot on the photoreceptive surface and a rotating polygon having mirrored facets. Those facets are illuminated with the laser beam and reflect that beam across the photoreceptive surface. The rotation of the polygon causes the laser beam to scan across the photoreceptive surface in a fast scan (i.e., the scan line) direction. Meanwhile, the photoreceptive surface is relatively slowly advanced in a process direction, called the slow scan direction, which is orthogonal to the fast scan direction. In this manner, the photoreceptive surface is raster scanned by a spot produced on the photoreceptive surface by the laser beam.

With raster output scanners of the type described above it is important that the raster swept spot illuminates the photoreceptive surface with a substantially uniform intensity (when turned on). Otherwise, poor print quality will result. Generally, the raster output scanner's polygon is rotated at an essentially constant angular velocity. Raster output scanners usually employ some procedure that prevents the light from the polygon facets from varying significantly in intensity as the polygon rotates. One procedure is to over-fill the rotating facets with light: i.e., the facet illuminating beam is made larger than the individual facets, thereby simultaneously illuminating two or more facets. Over-filled raster output scanners are discussed, for example, in U.S. Pat. No. 3,995,110, and have been used in the Model 9700 electronic printing system manufactured by Xerox Corporation. An advantage of over-filling is that it allows smaller facets to be used, therefore a larger number of facets can be incorporated in a given polygon diameter. This is benefical for high speed printing. However, over-filled raster output scanners have the disadvantage of relatively low power efficiency given that a substantial part of the laser beam is lost due to the spreading of the laser beam to fill several facets. Another disadvantage of over-filled raster output scanners is that they are relatively expensive.

Another procedure that prevents the light from the polygon facets from varying significantly in intensity as the polygon rotates is to under-fill the facets. In under filled raster output scanners the laser beam which illuminates the facets is adjusted to have a smaller cross-sectional area than the cross-sectional area of the facets. In this arrangement, almost all of the laser output power is available during scanning. However, under-filled systems require larger facets and therefore the systems prints at a slower speed for a given polygon diameter and motor rotation speed.

The problems with under-filled and overfilled raster output scanners has led to the procedure of facet tracking. In facet tracking the cross-sectional area of the laser beam illuminating the facets is made less than the cross-sectional area of the facets of the and the position of the spot formed by the laser beam on each facet is adjusted to follow the illuminated facet as it rotates. In facet tracking systems the laser beam remains on the active deflecting facet for a period of time which is at least equal to the duration of time required for the spot on the photoreceptive surface to sweep across the area of the photoreceptive surface which produces a latent image. Exemplary facet tracking systems are disclosed in U.S. Pat. Nos. 3,910,657 and 4,230,394.

While facet tracking systems are beneficial for high speed and optical efficiency they tend to be relatively complex in that numerous components are required to implement the procedure.

One skilled in the art will appreciate that the use of precision optics requires not only high quality optical elements, but also tight control in the positioning of those optics in order to obtain the very precise mechanical control required to adjust the position of the laser beam on the facet. Acoustooptic facet tracking as used in the Xerox Model 9700 uses an acoustooptic modulator, various optical elements, rf-electronics and power amplifiers to modulate the gas laser. Incorporating those elements in a system which uses a modulated laser diode is a substantial burden. High quality optical elements are also relatively expensive and require a correspondingly accurate high frequency signal generator and related electronics to produce and to maintain quality scan beam positioning. Further, such systems which incorporate feedback circuits to provide mechanical reorientation of rotating or translating mirrors generally operate too slowly to correct for motion quality errors because mirror components are relatively bulky and are difficult to move precisely and quickly.

Therefore, a new method and apparatus of implementing facet tracking would be beneficial.

SUMMARY OF THE INVENTION

The principles of the present invention provides for improved raster output scanners, and improved electrostatographic printing machines which use raster output scanners, in which facet tracking is achieved by using a semiconductor laser having an electronically tunable wavelength which emits a laser beam which is directed onto the facets of a rotating polygon by a wavelength dispersive element. A wavelength dispersive element, such as a diffraction grating or a prism, converts a change in wavelength to a change in the angle of the laser beam. The wavelength dispersive element is positioned, and the wavelength of the laser beam from the laser is systematically changed, such that as the polygon rotates the laser beam produces a spot on the facet which tracks the facet.

BRIEF DESCRIPTION OF THE DRAWINGS

Other aspects of the present invention will become apparent as the following description proceeds and upon reference to the drawings, in which.

In the drawings, like numbers designate like elements, Additionally, the text includes directional signals which are taken relative to the drawings (such as right, left, top, and bottom). Those directional signals are meant to aid the understanding of the present invention, not to limit it.

DETAILED DESCRIPTION OF THE PREFERRED EMBODIMENTS

The following description is presented in the context of a particular application. It is to be understood that the principles defined herein may be applied to other embodiments without departing from the spirit and scope of the present invention. Thus, the present invention is not intended to be limited to the particular embodiment shown, but is to be accorded the widest scope consistent with the principles and features disclosed herein.

Figure 1:
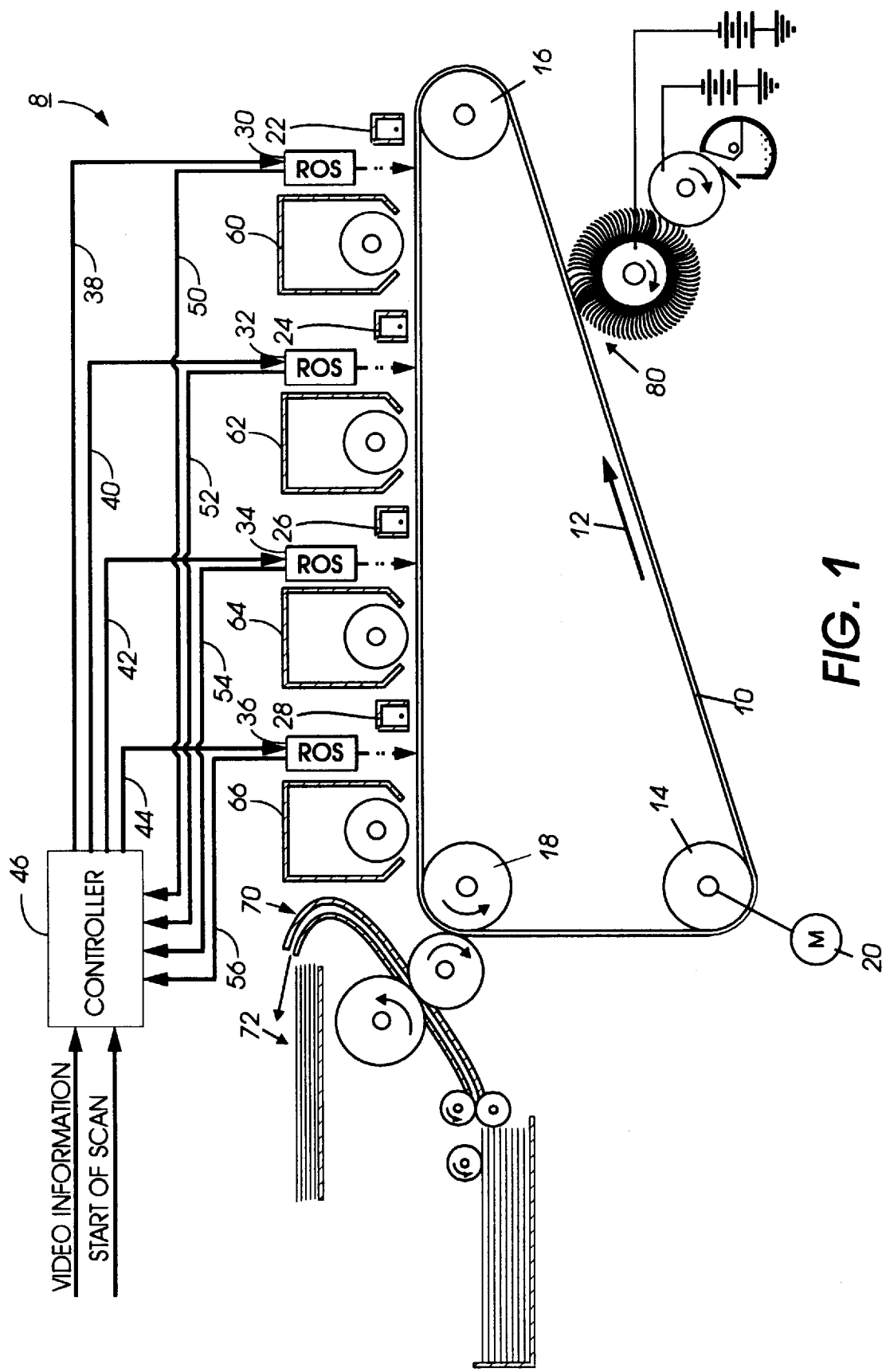
FIG. 1 schematically depicts a single pass, four color printing machine which is suitable for incorporating the principles of the present invention.

FIG. 1 illustrates a single pass, four color electrostatographic printing machine 8 which, as is subsequently described, incorporates the principles of the present invention. The printing machine 8 includes a charge retentive surface in the form of an Active Matrix (AMAT) photoreceptor 10 which has a photoreceptive surface and which moves in the direction indicated by the arrow 12. Photoreceptor movement is brought about by mounting the photoreceptor about a drive roller 14 and two tension rollers, the rollers 16 and 18, and then rotating the drive roller 14 via a drive motor 20.

As the photoreceptor moves each part of it passes through each of the subsequently described process stations. For convenience, sections of the photoreceptor, referred to as image areas, are identified. An image area is a part of the photoreceptor which is operated on by the various process stations so as to produce a developed image. While the photoreceptor may have numerous image areas, since each image area is processed in the same way a description of the processing of one image area suffices to explain the operation of the printing machine.

As the photoreceptor 10 moves a first image area passes a first corona generating corotron 22, a second image area passes a second corona generating corotron 24, a third image area passes a third corona generating corotron 26, and a fourth image area passes a fourth corona generating corotron 28. Each of the corotrons charge their associated image areas to a relatively high and substantially uniform potential, for example about −500 volts. While the image areas are described as being negatively charged, they could be positively charged if the charge levels and polarities of the other relevant sections of the printing machine 8 are appropriately changed. It is to be understood that power supplies, which are not shown, power the various corotrons and the other devices which are subsequently described as required so that they can perform their intended functions.

After passing the corotrons the first, second, third, and fourth charged image areas are exposed, respectively, by laser based raster output scanners 30, 32, 34, and 36. Each of the raster output scanners is in accordance with the ROS system 100 illustrated in FIG. 2, subsequently described. The various raster output scanners each sweep a modulated laser beam across their image areas in a fast scan direction as the photoreceptor 10 advances in the direction 12. Each raster output scanner thereby exposes its image area with a light representation of a different color of image. For example, the raster output scanner 30 might expose the first image area with a light representation of a black image, the raster output scanner 32 might expose the second image area with a light representation of a cyan image, the raster output scanner 34 might expose the third image area with a light representation of a yellow image, and the raster output scanner 36 might expose the fourth image area with a light representation of a magenta image. The light representations are derived from laser current drive signals applied to the raster output scanners 30, 32, 34, and 36, via, respectively, laser drive current lines 38, 40, 42, and 44, from the controller 46.

The controller 46 receives and processes both video information and a start of scan signal (or signals) to produce the laser current drive signals for the various scanners. The video information contains a digital representation of a composite image that is to be produced; that video information can be from any of a number of sources, including a computer, a facsimile machine or a raster input scanner. The start of scan signal informs the controller that the laser beams are at predetermined positions. By decoding the video information into laser current drive signals, and by synchronizing the application of the laser current drive signals to the various scanners with the positions of the laser beams as they scan across the image areas, the desired latent images can be produced upon the image areas.

After passing their associated scanners the exposed first, second, third, and fourth image areas are developed, respectively, at first, second, third, and fourth development stations, the station 60, 62, 64, and 66. The first development station 60 advances negatively charged toner of a first color (black) onto the first image area, the second development station 62 advances negatively charged toner of a second color (cyan) onto the second image area; the third development station 64 advances negatively charged toner of a third color (yellow) onto the third image area; and the fourth development station 66 advances negatively charged toner of a fourth color (magenta) onto the fourth image area. The development material is attracted to the less negative sections of the image areas and repelled by the more negative sections. The result is four toner images on the photoreceptor 10.

After being developed the toned image areas sequentially advance to a transfer station 70. Using any of a number of well known techniques the various toner images are placed in a superimposed registration so as to produce a desired composite image. That composite image is then permanently affixed to a substrate 72. After their toner layer is transferred to the transfer station 70 the image areas are cleaned of residual toner and other debris at a cleaning station 80. The image areas are then ready to produce another latent image.

The foregoing has generally described a single pass, four color electrophotographic printer which, like other devices, is suitable for incorporation of the present invention. That invention relates to facet tracking within the raster output scanners.

Figure 2:
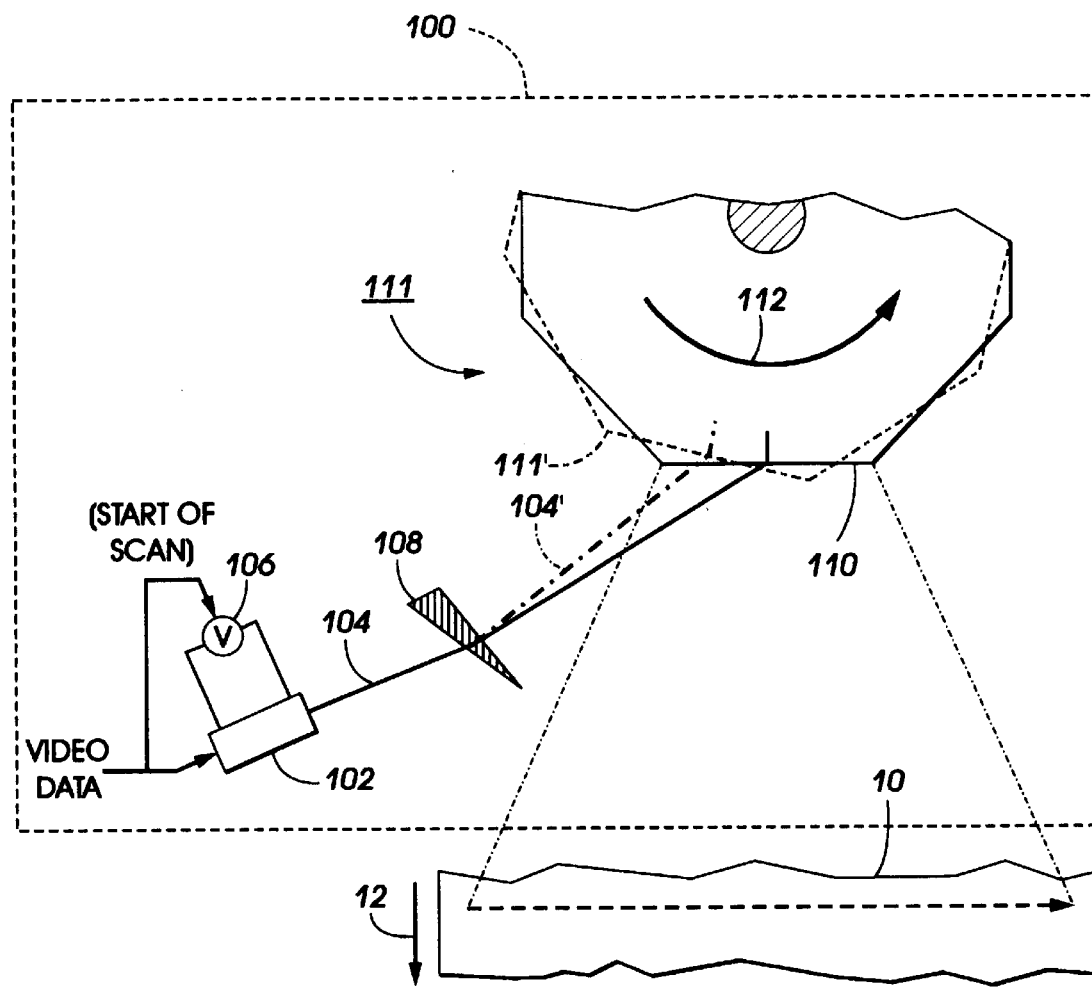
FIG. 2 shows a simplified schematic fragmentary plan view of a raster input scanner used in the printing machine illustrated in FIG. 1.

Reference is now made to FIG. 2, wherein there is illustrated, in a simplified form, a raster output scanner 100 which is in accord with the principles of the present invention. The raster output scanner includes an electronically adjustable, variable wavelength semiconductor diode 102, which in the raster output scanner 100 is a distributed Bragg reflector laser, which outputs a laser beam 104. The laser diode is video modulated by video data from the controller 46 (see FIG. 1) and by an electronic signal, assumed to be a voltage but a current may be preferred in practice, from a source 106. The source receives from the controller information related to the start of scan position of the laser beam.

The laser beam 104 passes through a wavelength dispersive element 108 onto a facet 110 of a polygon 111. The wavelength dispersive element is a transmissive diffraction grating, but other types of wavelength dispersive elements, such as reflective diffraction gratings, or plastic or glass prisms, may be preferred in a given application. It is assumed that the polygon rotates in the direction of the arrow 112. It should be noted that the laser beam's optical path is greatly simplified. In practice, beam focusing optical elements would be placed in the optical path both before the polygon and after so as to focus the laser beam into a relatively small spot on the facet 110 and, subsequently, into a relatively small spot on the photoreceptive surface. Depending upon the particular application, other optical functions might also be achieved by those optical elements. However, since those elements are well known they are not shown in FIG. 2 to avoid confusion.

In accordance with the principles of the present invention the wavelength of the semiconductor diode is adjusted such that the wavelength dispersive element causes the laser beam to track the moving polygon facet during the scan line time interval. That is, at least during the time period in which the spot on the photoreceptive surface is tracing a scan line in an image area, voltage induced wavelength changes in the laser beam cause the wavelength dispersive element to vary the angle at which light leaves that element such that the spot on the rotating facet moves with the changing position of the facet and such that that spot remains substantially locked in its position on the facet.

FIG. 2 illustrates the principle described above by showing both the laser beam from the wavelength dispersive element and the polygon at two different times, once with dashed lines, i.e., the laser beam 104' and the polygon 111', and once with solid lines. It is assumed that the dashed lines represent the laser beam and the polygon at an earlier time than that of the solid lines. At that earlier time the voltage applied to the semiconductor diode 102 is at a first voltage. That first voltage causes the wavelength of the laser beam to be at a first wavelength. The interaction of the laser beam at that first wavelength causes the wavelength dispersive element to deflect the laser beam 104' onto the facet 110' such that a spot is produced at about the center of a facet. As the facet rotates the voltage applied to the semiconductor diode changes such that the wavelength of the laser beam changes such that the interaction of the laser beam with the wavelength dispersive element varies the deflection of the laser beam such that the laser beam remains fixed on the center of the facet. For example, at the second time, a second voltage applied to the semiconductor diode causes the laser beam 104 to have a wavelength such that the wavelength dispersive element causes the deflection of the laser beam to be such that the laser beam is fixed on the center of the facet 110.

Figure 3:
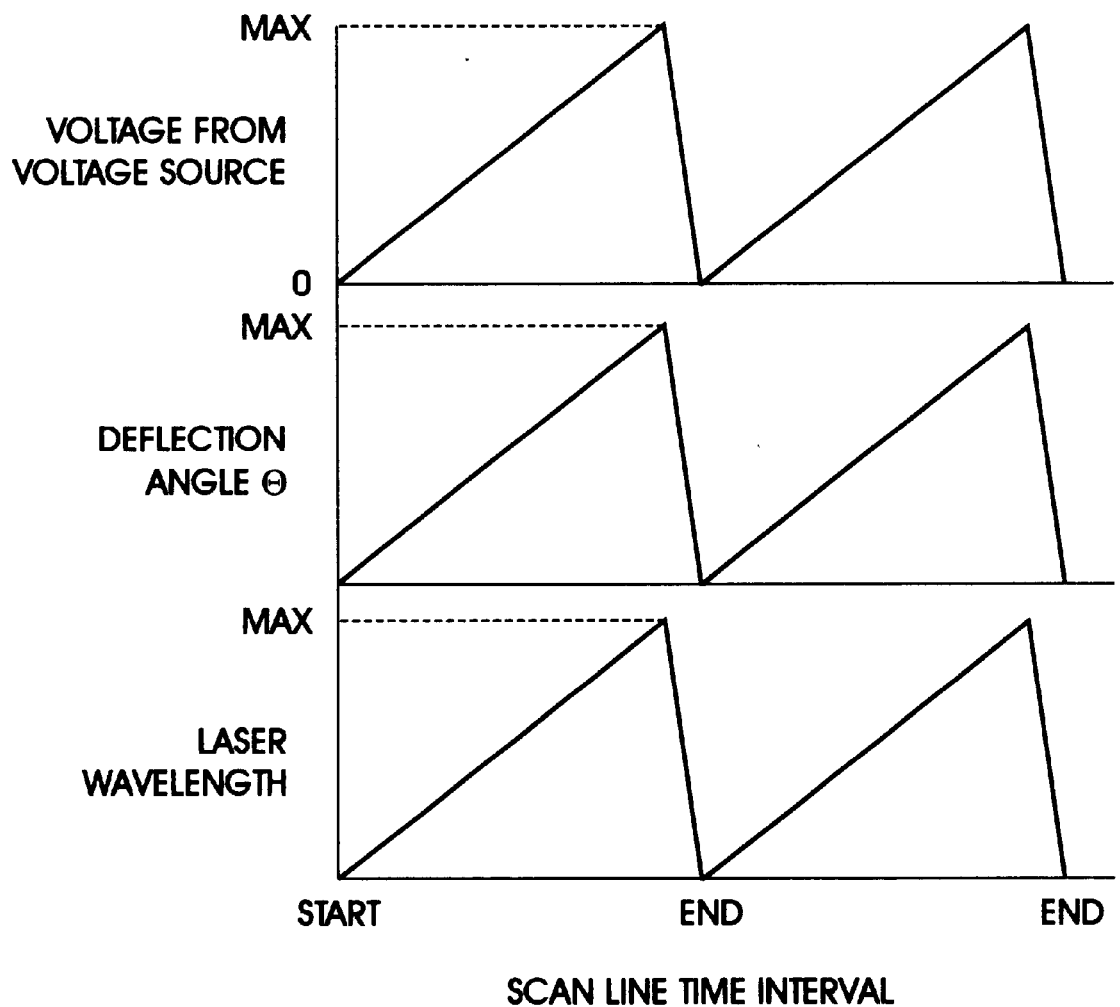
FIG. 3 illustrates graphs showing idealized relationships between an electronic signal, the wavelength of a laser beam, and the deflection angle of the beam from a wavelength dispersive element.

FIG. 3 graphically illustrates idealized interactions of the voltage source, the laser beam wavelength, and the polygon position. It is assumed that the X axis shows a period of time which corresponds to two scan line time intervals. At the start of the first scan interval time interval the voltage applied to the semiconductor diode is assumed to be zero. At this voltage the laser diode produces a minimum wavelength, the laser beam is minimally deflected by the wavelength dispersive element, and a facet spot is centered on a facet. As the polygon rotates the voltage applied to the semiconductor laser increases, causing the laser wavelength to increase, which causes the deflection angle to increase so as to maintain the facet spot on the center of the facet. This interaction continues until the polygon rotates to end of the first scan line. At that time the voltage from the voltage source drops to zero, and the laser beam wavelength and the deflection angle return to their minimum positions. At this time a facet spot is formed at the center of another facet and the process repeats. Again, the interactions illustrated in FIG. 3 are idealized. In practice the interactions will probably be much more complex, possibly non-linear, and likely temperature and/or material dependent. Of particular note, linearizing of the scan line to maintain pixel to pixel uniformity may be required in practical systems.

As noted, the semiconductor laser 102 is a distributed Bragg reflector laser. Other types of lasers which emit laser beams having wavelengths which can be electronically adjusted are also known in the prior art. Reference to wavelength tunable lasers may be found in U.S. Pat. No. 5,204,694, issued to Andrews on Apr. 20, 1993; in U.S. Pat. No. 5,208,456, issued to Appel et al. on May 4, 1993; in U.S. Pat. No. 5,204,523, issued to Appel et al. on Apr. 20, 1993; in the citations found in those United States Patents; and in numerous other patent and non-patent references.

Others who are skilled in the applicable arts will recognize numerous modifications and adaptations of the illustrated embodiment which will remain within the principles of the present invention. Indeed, practical implementations of the present invention are believed to be numerous and diverse. For example, using a distributed Bragg reflector laser with a grating surface emitting region and/or spherical beam collimating elements, and/or spot position feedback control may prove beneficial in a given application. Therefore, the present invention is to be limited only by the appended claims.

What is claimed:

1. A scanner, comprising:

a laser for emitting a laser beam having a wavelength which is a function of an electric signal;

a source for applying a variable electric signal to said laser;

a rotating facet for sweeping the laser beam in a scan line; and a wavelength dispersive element for receiving the laser beam and for directing the laser beam onto the rotating facet to form a spot;

wherein said wavelength dispersive element is positioned, and said source varies the electric signal to said laser such that the spot tracks the rotation of said facet.

2. The scanner according to claim 1, wherein said laser comprises a semiconductor laser.

3. The scanner according to claim 2, wherein said semiconductor laser comprises a distributed Bragg reflective laser.

4. The scanner according to claim 1, wherein said wavelength dispersive element is a dispersive grating.

5. The scanner according to claim 1, wherein said wavelength dispersive element comprises a transmissive dispersive grating.

6. A document production machine of the type including a moving photoreceptive surface; a charging station for placing a charge on the photoreceptive surface; an exposure station for producing an electrostatic latent image on the photoreptive surface; a developing station for developing the electrostatic latent image with toner particles; and a transfer station for transferring the developed image to a copy sheet; wherein the exposure station comprises:

a laser for emitting a laser beam having a wavelength which is a function of an electric signal;

a source for applying a variable electric signal to said laser;

a rotating facet for sweeping the laser beam in a scan line across said photoreceptive surface; and a wavelength dispersive element for receiving the laser beam and for directing the laser beam onto the rotating facet to form a spot;

wherein said wavelength dispersive element is positioned, and said source varies the electric signal to said laser such that the spot tracks the rotation of said facet.

7. The document production machine according to claim 6, wherein said laser comprises a semiconductor laser.

8. The document production machine according to claim 7, wherein said semiconductor laser comprises a distributed Bragg reflective laser.

9. The document production machine according to claim 6, wherein said wavelength dispersive element comprises a dispersive grating.

10. The document production machine raster scanner according to claim 6, wherein said wavelength dispersive element comprises a transmissive dispersive grating.

11. A method of facet tracking comprising the steps of:

passing a variable wavelength laser beam through a wavelength dependent dispersive element into a spot on a selected area of a rotating facet; and varying the wavelength of the laser beam such that the spot follows the selected area as the facet rotates.

* * * * *